Patented June 12, 1934

1,962,831

UNITED STATES PATENT OFFICE 1,962,831

MANUFACTURE OF YEAST OF HIGH ENZYMATIC ACTIVITY

Miklos Moskovits, Budapest, Hungary

No Drawing. Application March 20, 1930, Serial No. 437,609. In Hungary March 22, 1929

17 Claims. (Cl. 195—20)

The invention relates to the manufacture of yeast and more particularly to a process for producing a yeast of good storability and high enzymatic activity.

The known methods of yeast manufacture, which are chiefly intended to increase the yield, are attended by the disadvantage that the yeast cells, while over-developed in respect to budding-force, suffer degeneration in other regards. Thus for example the rising power and the peptic action on the dough are materially lessened. Among the causes of these degenerative phenomena are to be reckoned, first, the fact that important enzymes of the cells during the rapid propagation, when they are not sufficiently employed in other directions, fail to develop to the necessary extent and with the desired efficacy, and secondly, the fact that the plasma of the cells is built up of easily decomposing proteins poor in nitrogen.

The object of the invention is to obviate these degenerative phenomena, while at the same time producing a highly active yeast.

The process according to the invention is essentially characterized in that, after the finishing of the propagation of the yeast according to any usual process, e. g. in a diluted, weakly acidulated wort, under energetic aeration, or at an advanced stage of propagation, the yeast is subjected to further development in such directions that on the one hand the cells and/or the cell-plasma acquire the proper chemical composition, and on the other hand their enzymes are developed to a high point of efficacy, as regards both quantity and quality.

Accordingly, the propagated yeast is further developed in two working stages. In the first stage, which is intended to perfect the cell-plasma, there are added to the wort further quantities of nitrogenous nutrient substances, and also small quantities of fermentable carbohydrates. In this stage the process is conducted in such a way that the further increase of the yeast is considerably impeded, suitably by greatly reducing aeration. Thus during this stage substantially a suitable feeding of the yeast is effected. As the nitrogenous nutritive substances added at this stage of work do not contain phosphorus, it is advisable to add to the wort while adding these nutritive substances slight quantities of phosphates, phosphoric acids or other phosphorus compounds, for instance ammonium phosphates. In the other stage, which is intended to develop the enzymes of the cells, the wort is enriched with carbohydrates. In this wort, which is energetically fermented, the enzymes become very active and thus get so developed that their efficacy is very materially increased.

Experiments have shown that in effecting the further development of the yeast in two stages, the order of these stages is not of decisive importance. It is advisable to proceed in such a manner that the increased yeast is first treated so as to produce the best possible composition of the cell-plasma, and only thereafter is the efficacious development of the enzymes undertaken. Success may however also be attained by proceeding in inverse order.

It has further been found suitable to separate the propagated yeast, which is to be further developed, from its wort and put it into fresh worts, which are to be prepared in accordance with the stages above-mentioned. But satisfactory results can also be attained when the propagated yeast is not separated from its wort, but the latter itself is given, by the addition of suitable substances, the respective compositions necessary for the two stages.

In that stage of work which is directed towards developing the cells, the nitrogenous additions to the wort may be organic or inorganic substances, or a mixture of both. When nitrogenous organic additions are employed, it is advisable previously to prepare these by means of a biological process (fermentation with lactic acid bacteria, yeast autolysis) or by means of oxy-acids under pressure. The quantity of the nitrogen is adjusted to 0.05 to 0.25%. The quantity of fermentable carbohydrates added simultaneously will suitably amount to about 1%.

In the stage for developing the enzymes, the concentration of the fermentable carbohydrates in the wort is increased to about 6%, but generally the quantity of carbohydrates should not be more than thirty times the quantity of the nitrogen in the wort.

The carbohydrates are added after acidification suitably produced by fermentation. To adjust the proper degree of acidity, the organic acid content of the wort can be supplemented by mineral acids, advantageously by sulphuric acid. The acid in the wort is generally adjusted so that, expressed as lactic acid, it amounts at most to 2½ times the quantity of the added nitrogen.

In the wort which serves for the perfect development of the yeast, the concentration of the latter is adjusted so as not to exceed 4%, calculated as dry substance.

*Example 1.*—The yeast is multiplied in a diluted wort of molasses or grain, by means of any customary process, under energetic aeration. After the finishing of the propagation process, the aeration is considerably lessened and there are added to the wort such quantities of yeast extract, prepared by lactic acid fermentation combined with autolysis, and of molasses or malt extract, that the amount of assimilable nitrogen in the wort is 0.12%, and that of sugar 1%. The lactic acid fermentation of the proteid substances is so conducted that, after their addition, the acid contained in the wort, calculated as lactic acid, is about 0.45%. After a few hours a thick extract of molasses or of malt is added, so that the fermentable carbohydrate in the wort increases to 6%, and the wort ferments energetically. After the rapid attainment of a high degree of fementation, the yeast is separated off, and treated in the usual manner.

In the course of this development the quantity of the yeast increases by about 30%. The qualitative improvement effected manifests itself chiefly in the increase of the rising power by about 30%, as well as in the high storability of the yeast.

*Example 2.*—The multiplied yeast is separated from the wort and put into a fresh one, containing about 1% of fermentable sugar and 0.12% of assimilable nitrogen. The latter is added to the wort in the form of a yeast extract previously prepared by means of oxy-acids, or in the form of other suitable proteid substances previously prepared in a similar manner, or in the form of products of proteid decomposition. The quantity of acid in the wort is adjusted, if found insufficient, by adding further lactic acid, to 0.45%. Thereafter the process is carried out as in the first example.

*Example 3.*—The process is carried out as in Examples 1 and 2, in such a manner that the necessary nitrogen is added to the wort entirely or partly in the form of inorganic nutrient salts, e. g. ammonium phosphates, etc. The carbohydrate solution which is to be added, mixed with a small quantity of yeast-extract, is first submitted to lactic acid fermentation. The quantity of acid in the wort is adjusted to 4° (that is: 100 ccm. of the wort are neutralized by 4 ccm. of normal alkali); if there is not sufficient acid, lactic or sulphuric acid may be added.

*Example 4.*—After the propagation of the yeast, the quantity of the acid in the wort is raised to 4°, and such quantities of thick extract of molasses or of malt are added that the wort contains about 5% of fermentable sugar. After the principal fermentation has come to an end, yeast extract prepared by lactic acid fermentation, or protein substances previously prepared by oxy-acids, or proteid products, are added to the wort in such quantities that the quantity of nitrogen in the wort amounts to about 0.12%. By simultaneous addition of carbohydrates the sugar in the wort is raised to about 1%. Then the process is carried to an end under weak aeration, and the yeast is separated off.

Various changes may be made in the details described in the foregoing specification without departing from the invention or sacrificing the advantages thereof.

I claim:—

1. A process for the regeneration of yeast consisting in subjecting the yeast to a wort rich in nitrogenous nutrient substances, while at the same time passing air in contact with the yeast at a rate which causes effective propagation to substantially cease, and then subjecting the yeast to an enzymic development in a wort containing fermentable carbohydrates.

2. A process for the regeneration of yeast consisting in subjecting the yeast to a feeding involving the assimilation of nitrogen from a wort to which assimilable nitrogen and lactic acid have been added while at the same time passing air in contact with the yeast at a rate which causes effective propagation to substantially cease, and then developing the enzyms of the yeast by strongly fermenting the same in a wort containing fermentable carbohydrates.

3. A process for the regeneration of yeast, consisting in feeding the yeast by causing the yeast cells to assimilate nitrogen from a wort containing 0.05 to 0.25 per cent of assimilable nitrogen and 0.12 to 0.60 per cent of lactic acid, with about one per cent of fermentable carbohydrates under non-propagating aeration, and then developing the enzyms of the yeast by strong fermentation in a wort containing four to six per cent of fermentable carbohydrates.

4. A process for the regeneration of yeast consisting in subjecting the yeast to a feeding by causing the cells to assimilate nitrogen from a wort containing assimilable nitrogen in the form of organic nitrogenous substances prepared through biological processes, and during the feeding stage passing air in contact with the yeast at a rate insufficient to sustain effective propagation and then developing the enzyms of the yeast by strong fermentation in a wort rich in fermentable carbohydrates.

5. A regenerative process for yeast consisting in subjecting the yeast to a feeding step for improving the plasma of the cells and causing the cells to assimilate nitrogen from a wort containing 0.05 to 0.25 per cent of assimilable nitrogen in the form of organic nitrogenous substances prepared by means of lactic acid and about one percent of fermentable carbohydrates, passing air in contact with the yeast, during the feeding step, at a rate insufficient to sustain effective propagation, and then subjecting the yeast to an enzymic development by strongly fermenting the same in a wort containing four to six per cent of fermentable carbohydrates.

6. A regenerative process for yeast consisting in improving the plasma of the yeast cells and feeding the same by subjecting the yeast to a wort containing assimilable nitrogen partly in the form of organic and partly in the form of inorganic nitrogenous substances, with a slight quantity of fermentable carbohydrates, subjecting the yeast during this step to an aeration insufficient for definite propagation, and then subjecting the yeast to enzymic development by strongly fermenting the same in a wort rich in fermentable carbohydrates.

7. A process for the regeneration of yeast consisting in subjecting the yeast to a two-stage development, the first stage consisting in feeding and improving the plasma of the cells by causing them to assimilate nitrogen from a wort containing assimilable nitrogen and small quantities of fermentable carbohydrates, the yeast during this stage being subjected to an aeration insufficient for definite propagation, the second stage consisting in enzymic development of the yeast by strong fermentation in a wort containing fermentable carbohydrates previously subjected to a biological acidifying process to present a predetermined degree of acidity.

8. A regenerative process for yeast consisting in subjecting the yeast to a two-stage development, the first stage consisting in feeding the yeast in a wort containing assimilable nitrogen with limited quantities of fermentable carbohydrates, while maintaining an aeration insufficient for definite propagation, the second stage consisting in enzymic development of the yeast by strong fermentation in a wort containing fermentable carbohydrates previously subjected to a biological acidifying process, together with further quantities of acid to maintain a predetermined degree of acidity.

9. A process for the regeneration of yeast consisting in subjecting the yeast to a development in two stages, the first stage consisting in feeding and improving the plasma of the cells by causing the cells to assimilate nitrogen from a wort containing assimilable nitrogen in the form of organic nitrogenous substances previously prepared by means of biological processes, together with slight quantities of fermentable carbohydrates, and at the same time passing air in contact with the yeast at a rate which causes effective propagation to cease, the second stage consisting in enzymic development of the yeast by strong fermentation in a wort containing fermentable carbohydrates previously subjected to a biological acidifying process, together with predetermined quantities of lactic acid.

10. A process for the regeneration of yeast consisting in subjecting the yeast to a development in two stages, the first of which consists in feeding and improving the plasma of the cells by causing them to assimilate nitrogen from a wort containing assimilable nitrogen and phosphorous, together with slight quantities of fermentable carbohydrates, the yeast during this stage being maintained under an aeration insufficient for definite propagation, the second stage consisting in enzymic development of the yeast by strong fermentation in a wort rich in fermentable carbohydrates.

11. A regenerative process for yeast consisting in first feeding and improving the plasma of the cells by causing them to assimilate nitrogen from a wort containing 0.05 to 0.25 per cent of assimilable nitrogen and 0.12 to 0.60 per cent of lactic acid and about one per cent of fermentable carbohydrates, the propagation of the yeast during this step being impeded, and then strongly fermenting the yeast in a wort containing four to six per cent of fermentable carbohydrates.

12. A regenerative process for yeast consisting in first feeding and improving the plasma of the cells by causing them to assimilate nitrogen from a wort containing 0.05 to 0.25 per cent of assimilable nitrogen and slight quantities of a yeast assimilable phosphate and 0.12 to 0.60 per cent of lactic acid and about one per cent of fermentable carbohydrates, the propagation of the yeast during this step being impeded, and then strongly fermenting the yeast in a wort containing four to six per cent of fermentable carbohydrates.

13. A regenerative process for yeast consisting in feeding the yeast in a wort containing assimilable nitrogen, slight quantities of a yeast assimilable phosphate and small quantities of fermentable carbohydrates, the propagation of the yeast being impeded during this feeding operation, and then subjecting the yeast to enzymic development by strong fermentation in a wort containing fermentable carbohydrates and in which the acidity is 1/25 normal.

14. A regenerative process for yeast consisting in subjecting the yeast to a development in two stages, one of which consists in feeding and improving the plasma of the cells by causing them to assimilate nitrogen from a wort to which assimilable nitrogen and also slight quantities of fermentable carbohydrates are added, propagation being impeded during the assimilation process, and the other stage consisting in developing the enzyms of the yeast in a wort rich in fermentable carbohydrates by strongly fermenting the same.

15. A regenerative process for yeast consisting in subjecting the yeast to a development in two stages, one of which consists in feeding and improving the plasma of the cells by causing them to assimilate nitrogen from a wort to which assimilable nitrogen and also small quantities of fermentable carbohydrates are added while at the same time passing air in contact with the yeast at a rate insufficient for effective propagation, and the other stage consisting in developing the enzyms of the yeast by strongly fermenting a wort containing fermentable carbohydrates previously subjected to a biological acidifying process to render the acidity of the wort substantially 1/25 normal.

16. A regenerative process for yeast consisting in subjecting the yeast to a development in two stages, one of which consists in feeding and improving the plasma of the cells by causing them to assimilate nitrogen from a wort to which assimilable nitrogen and small quantities of phosphorous compounds and also slight quantities of fermentable carbohydrates are added, propagation being impeded during the assimilation process, and the other stage consisting in developing the enzyms of the yeast in a wort rich in fermentable carbohydrates by strongly fermenting the same.

17. A regenerative process for yeast consisting in subjecting the yeast to a development in two stages, one of which consists in feeding and improving the plasma of the cells by causing them to assimilate nitrogen from a wort to which assimilable nitrogen and slight quantities of a yeast assimilable phosphate and also small quantities of fermentable carbohydrates are added, propagation being impeded during the assimilation process, and the other stage consisting in developing the enzyms of the yeast by strongly fermenting a wort containing fermentable carbohydrates previously subjected to a biological acidifying process so that the degree of acidity is substantially 1/25 normal.

MIKLOS MOSKOVITS.